United States Patent Office 3,314,345
Patented Apr. 18, 1967

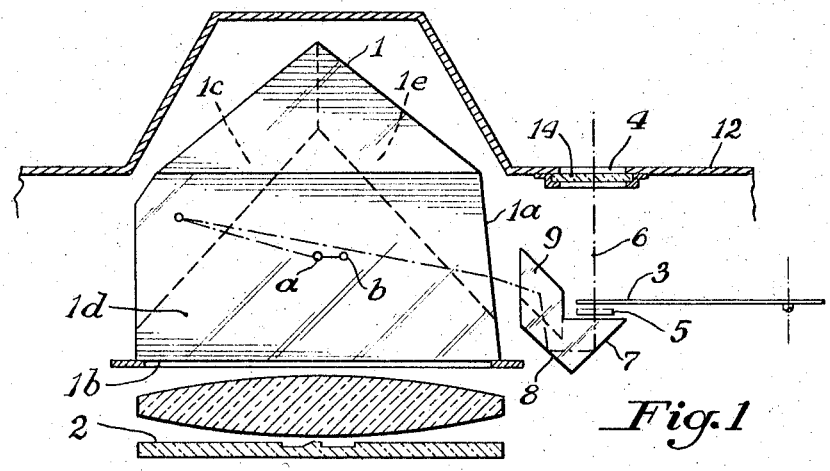
Fig. 1
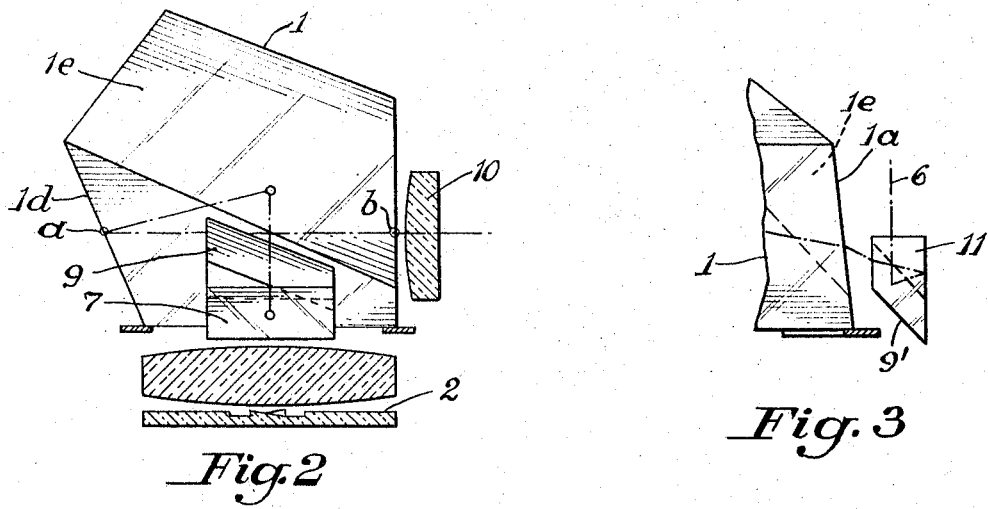
Fig. 2
Fig. 3
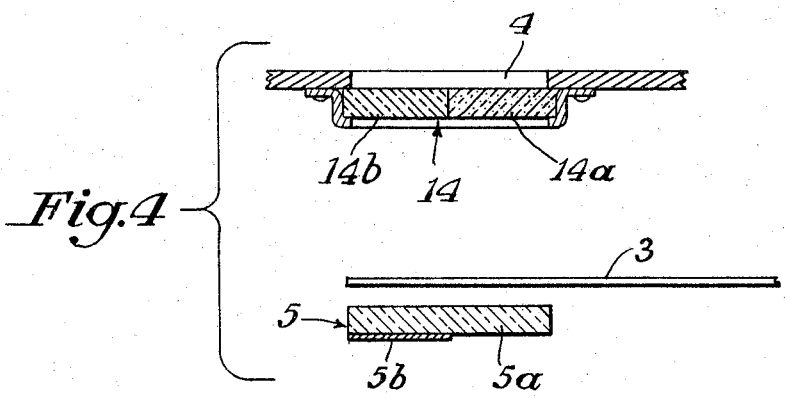
Fig. 4

3,314,345
SINGLE LENS MIRROR REFLEX CAMERA
Helmut Ebertz and Willi Günther, Stuttgart-Mohringen, and Roland Rudat, Wurttemberg, Germany, assignors to Zeiss Ikon Aktiengesellschaft, Stuttgart, Germany
Filed Sept. 2, 1964, Ser. No. 393,922
Claims priority, application Germany, Sept. 21, 1963, Z 10,370
4 Claims. (Cl. 95—10)

The invention relates to a single lens mirror reflex camera provided with a penta roof edge prism and a built-in exposure meter whose pointer has its play outside the viewfinder light beam and is reflected into the viewfinder light beam by means of one of the reflecting roof edge prism faces and the reflecting face of the penta roof edge prism which serves for erecting the viewfinder image.

It is the object of the invention to eliminate the projecting means in the known reflecting methods without having to accommodate the play of the pointer in the focusing plane of the viewfinder. Related thereto is the additional object of the invention to observe the pointer play from the outside, for instance through an opening in the camera top wall. The projecting means heretofore employed are structurally cumbersome and their mounting takes up a great deal of space so that such devices are burdened with considerably high costs.

In accordance with the invention, an image of the pointer play, which latter is arranged in a plane conjugate with the focusing plane, is reflected into the penta roof edge prism through one of its side surfaces, if desired by means of additional deflecting means and an additional mirror which at least approximately has the same inclination as the adjacent roof edge face of the penta prism.

The invention proceeds from the following observations: The viewfinder focusing plane and the planes conjugate thereto are the ones in which the pointer is viewed sharply. If the pointer is to be arranged outside the focusing plane and outside the viewfinder light beam, or closer to the viewing opening in the camera top wall, respectively, the length of the reflecting light beam between the focusing plane and its last place of reflection within the penta prism determines the location for the bodily accommodation of the pointer play. If the reflective light beam is diverted from the penta roof edge prism before it has reached the focusing plane, the pointer may be moved out of the focusing plane in the direction toward the upper camera top wall. This will result in a reflection of a pointer image into the viewfinder light beam without the employment of projecting means, and the distance of the pointer from the camera top wall will be reduced so much that an observation from the outside is possible.

A further advantage is that due to the selected inclination of the additional mirror the reflected image of the scale shows the same orientation as the viewfinder image in the focusing plane. Heretofore the inclined position of the image of the scale with respect to the viewfinder image was often annoying. The deflecting means required for reflecting an image of the pointer into the viewfinder light beam or into the neighborhood of its lateral portion, respectively, may be arranged in the direction of reflection between the additional mirror and the penta roof edge prism or behind these two members. In the one case the additional mirror substantially forms a continuation of the neighboring roof face of the penta prism, while in the other case the additional mirror has to be displaced in the direction of the focusing plate. This provides for different ways of mounting the exposure meter in the camera, whereby a better use of the space in the upper portion of the camera is made possible.

With these and other objects in view which will appear hereinafter, the invention will now be described in more detail with reference to the accompanying drawings, in which:

FIG. 1 illustrates a light ray deflection device mounted in the upper portion of a camera casing and is a view from the front wall of the camera casing;

FIG. 2 is a side elevation view of the deflection device;

FIG. 3 illustrates the position of the additional mirror when vertically displaced with respect to the adjacent roof edge face of the penta prism, and FIG. 4 illustrates a cover plate arrangement for the viewing opening of the indicated device.

Referring to FIGS. 1 and 2, the penta roof edge prism is designated with 1, and the horizontally positioned focusing plate is designated with 2. The lower side face 1a of the prism 1 which faces the exposure meter according to the divergent course of the viewfinder light beam is positioned somewhat inclined with respect to the horizontal base 1b and forms with it an angle less than 90°. The pointer 3 of the exposure meter plays over the scale 5 and underneath the opening 4 in the camera top wall 12. A vertical light beam 6 which enters the aperture 4 is successively reflected by the inclined deflecting mirrors 7 and 8 onto an additional mirror 9 and by the latter through the side face 1a of the penta prism onto the opposite roof edge face 1c. From there the beam of light, as indicated by the dash-dotted line, passes in known manner to the front reflecting face 1d and from the latter is reflected a the point a (FIG. 1) into the finder ocular 10 after it has left the prism exit face at the point b (FIG. 1). The position of the pointer play is determined by the condition that its plane must be conjugate with the focusing plane.

The deflecting mirrors 7 and 8 may be combined to form a prism body which may additionally serve as a support for the mirror 9. Instead of providing the surfaces 7 and 8 with a reflective layer, it would also be possible to make use of the total reflection on these surfaces. It is further possible to assemble this prism body having the deflecting faces 7 and 8 thereon, including the additional mirror 9 and its support, with the penta roof edge prism 1 so as to form one structural unit.

The additional mirror 9 whose inclination corresponds substantially to the position of the roof edge face 1e, is arranged in the FIGS. 1 and 2 so that it intercepts the light beam coming from the direction of the plane of the pointer play, which plane is optically associated with the plane of the focusing plate 2. The additional mirror 9 may, however, also be arranged as shown in FIG. 3 so that the reflecting light beam 6 coming from the pointer 3 first strikes the additional mirror 9' and from there passes through a reflecting face 11 and then into the penta roof edge prism 1.

As shown in the FIGS. 1 and 4, the aperture 4 in said camera top wall 12 preferably is covered by a member 14 which is partly transparent at 14a and partly translucent at 14b. The scale 5 below the pointer 3 is partly transparent at 5a and partly opaque or covered with a mirror layer 5b so that the movement of the pointer 3 may be observed from the exterior and interior of the camera.

What we claim is:
1. In a single lens mirror reflex camera provided with a viewfinder employing a penta roof edge prism and provided with an electric exposure meter having a movable pointer playing over a fixed scale, and in which an image of said pointer is projected by one of the reflecting faces of said roof edge prism into the viewfinder image, the improvement comprising the arrangement of said movable pointer in a plane which is conjugated to the focussing plane of the viewfinder so that the projec- tion of the image of said pointer into said penta roof edge prism takes place by a mirror (9) through the side face (1a) of said prism which is adjacent said pointer, said mirror (9) being arranged at substantially the same inclination as the adjacent roof face (1e) of said prism, and a carrier for said mirror, said carrier, said mirror and said penta roof edge prism being formed of a single member.

2. In a single lens mirror reflex camera provided with a viewfinder employing a penta roof edge prism and provided with an electric exposure meter having a movable pointer playing over a fixed scale, and in which an image of said pointer is projected by one of the reflecting faces of said roof edge prism into the viewfinder image, the improvement comprising the arrangement of said movable pointer in a plane which is conjugated to the focussing plane of the viewfinder so that the projection of the image of said pointer into said penta roof edge prism takes place by a mirror (9) through the side face (1a) of said prism which is adjacent said pointer, said mirror (9) being arranged at substantially the same inclination as the adjacent roof face (1e) of said prism, and including additional deflecting means arranged between said mirror and said penta roof edge prism, said additional deflecting means being vertically displaced with respect to the adjacent roof face of said prism, said penta roof edge prism, said mirror and said additional deflecting means are formed of a single unit of construction.

3. In a single lens mirror reflex camera provided with a viewfinder employing a penta roof edge prism and provided with an electric exposure meter having a movable pointer playing over a fixed scale, and in which an image of said pointer is projected by one of the reflecting faces of said roof edge prism into the viewfinder image, the improvement comprising the arrangement of said movable pointer in a plane which is conjugated to the focussing plane of the viewfinder so that the projection of the image of said pointer into said penta roof edge prism takes place by a mirror (9) through the side face (1a) of said prism which is adjacent said pointer, said mirror (9) being arranged at substantially the same inclination as the adjacent roof face (1e) of said prism, said camera having a top wall provided with an aperture through which the pointer of said exposure meter and said scale may be observed.

4. In a single lens mirror reflex camera provided with a viewfinder employing a penta roof edge prism and provided with an electric exposure meter having a movable pointer playing over a fixed scale, and in which an image of said pointer is projected by one of the reflecting faces of said roof edge prism into the viewfinder image, the improvement comprising the arrangement of said movable pointer in a plane which is conjugated to the focussing plane of the viewfinder so that the projection of the image of said pointer into said penta roof edge prism takes place by a mirror (9) through the side face (1a) of said prism which is adjacent said pointer, said mirror (9) being arranged at substantially the same inclination as the adjacent roof face (1e) of said prism, said camera having a top wall provided with an aperture through which the pointer of said exposure meter and said scale may be observed, said aperture being covered by a partly transparent and partly translucent member, and said scale being partly transparent and partly opaque.

References Cited by the Examiner

UNITED STATES PATENTS

| 2,933,991 | 4/1960 | Sauer | 95—42 X |
| 3,017,812 | 1/1962 | Kodalle et al. | 95—10 |

FOREIGN PATENTS

| 1,240,877 | 8/1960 | France. |
| 1,281,978 | 12/1961 | France. |

NORTON ANSHER, *Primary Examiner.*

J. F. PETERS, *Examiner.*